United States Patent Office 3,507,482
Patented Apr. 21, 1970

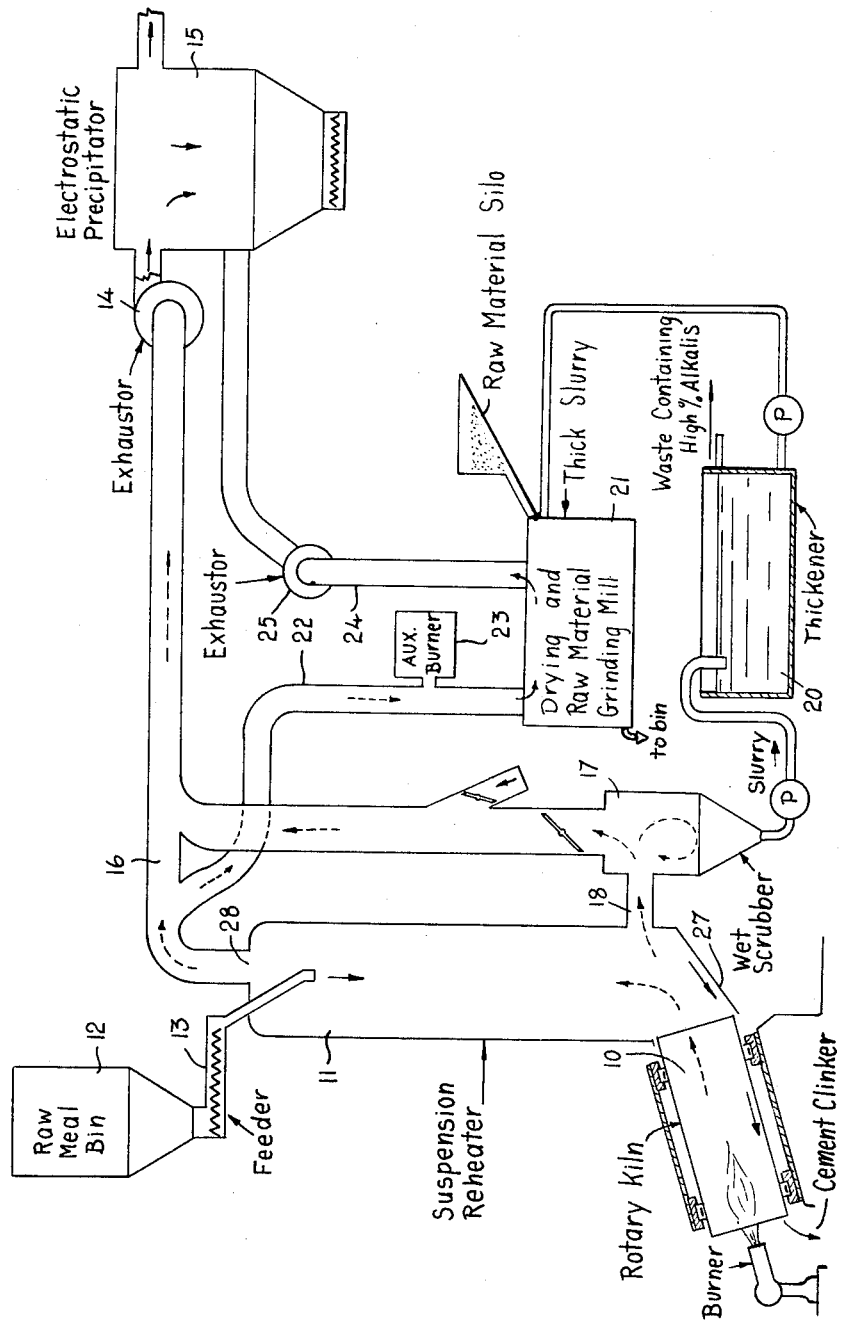

3,507,482
APPARATUS FOR REDUCING ALKALI CONTENT OF CEMENT CLINKER AND SIMULTANEOUSLY IMPROVING EFFICIENCY OF ELECTROSTATIC DUST COLLECTOR
Ludwik Kraszewski, 431 Palmer Ave., and George A. Zulauf, 2069 Lakeshore Road E., both of Oakville, Ontario, Canada
Filed Nov. 8, 1968, Ser. No. 774,314
Int. Cl. F27b 7/00
U.S. Cl. 263—32                    9 Claims

ABSTRACT OF THE DISCLOSURE

A cement clinker burning apparatus in which substantially a high percentage of the alkali content of the raw meal is removed by a by-pass which conducts the gases evolved in a rotary kiln for producing cement clinker and entrained particles to a wet scrubber where the alkali is removed from the gases in the form of a thin slurry containing a high percentage of dissolved alkali which is produced and drain means in the scrubber for continuously removing the slurry.

A method of reducing the alkali content of cement clinker produced in a cement clinker producing apparatus having a suspension preheater which delivers preheated raw meal to a rotary kiln wherein is produced cement clinker and hot gases containing alkali and solid material, an electrostatic precipitator being provided through which said gases are discharged to atmosphere in which:

(a) a portion of the hot exhaust kiln gases are withdrawn from a point adjacent the gas exhaust of the rotary kiln;
(b) said portion is passed through a wet scrubber to remove alkali and solid material therefrom and produce a thin slurry;
(c) the gaseous portion obtained from step (b) being then passed to the electrostatic precipitator; and
(d) the slurry is discharged from the scrubber to waste.

This invention relates to a method and apparatus for reducing the alkali content of cement clinker and simultaneously improving the efficiency of an associated electrostatic dust precipitator. A simple, dry process clinker burning system comprises a raw material grinding mill which prepares the raw meal for cement clinker production, a raw meal bin emptied by a feeder which feeds the raw meal into the upper end of a moderately tilted rotary kiln, the lower end of which contains a high temperature burner, the exhaust gases of which pass along the length of the tilted kiln, through an exhaustor, an electrostatic precipitator, a stack, and thence to the atmosphere. Cement clinker which contains alkali is undesirable because of its detrimental effect on cement quality. The alkali originates in the raw materials used for clinker production; a portion of the alkali remains in the clinker and the rest is evaporated in the burning zone and forms a source of pollution.

Not all the evaporated alkali remains in the gaseous state due to the exhaust gases cooling as they flow toward the upper end of the kiln, with the result that the exhaust gases become saturated with evaporated alkalis which then condense onto the raw material in the kiln at a gas temperature below about 1000° C. and are then re-evaporated in the burning zone. This recycling phenomenon results in inefficient alkali removal.

One means, heretofore used, of improving the basic clinker burning system was by providing a suspension pre-heater, between the feeder discharge and the upper end of the tilted kiln, of sufficient length to permit the rising exhaust gases to preheat the raw metal considerably before it enters the kiln. Although this reduces the heat lost in the exhaust gases and improves fuel economy it results in a higher alkali content of the clinker due to the prolonged and intimate mixing of the raw meal and the alkali-laden exhaust gases.

The state-of-the-art dry process clinker burning system provides, in addition, a by-pass for exhaust gases around the preheater and permits the intake of cold air, the amounts of hot air bypassed and cold air being regulated by dampers. This arrangement makes it possible to remove a portion of the gaseous alkali from the kiln exhaust gases.

It should be noted that many of these systems incorporate an electrostatic precipitator which functions by ionizing particles suspended in the exhaust gases. The ionized particles are strongly attracted to oppositely charged electrodes where they remain until said electrodes are cleaned by shaking. Electrostatic precipitators are more effective in wet process plants than in dry process plants because of the higher moisture content of the exhaust gases significantly improving the efficiency of the precipitator.

The present invention relates to an improvement in the state-of-the-art dry process method by providing a wet scrubber for the kiln exhaust gases which bypass the suspension preheater. The wet scrubber permits intimate contact between the gases and water; as a result, a portion of the alkali in the gases is dissolved in the water and a portion of the dust is captured by the water; some of the water is picked up by the hot exhaust gases as water vapour. The cleaned, moist gases flow via exhaustor, precipitator and stack to the atmosphere.

The water-dust mixture obtained in the preceding step discharges continuously from the scrubber as a thin alkaline slurry and is pumped to a settling tank where the insoluble solids tend to collect in the lower portion; the resulting thickened slurry is continuously removed through a drain, the dissolved alkali is removed in the excess water which is decanted by purposefully overflowing the settling tank. The thick slurry may be discharged into a row materials grinding and drying mill with subsequent moistening of the exhaust gases passing through the grinding mill circuit; the result is that the associated electrostatic precipitator operates more efficiently than before. The hot air for the grinding and drying mill may be produced by heating raw air or withdrawing exhaust gases from the preheater to exhaustor duct and reheating, if required, the gases with an auxiliary burner. It is also possible to use a separate precipitator or exhaustors for the cement clinker burner and the raw material grinding and drying mill.

The accompanying drawing illustrates a suitable apparatus for carrying out the process of this invention. The apparatus includes a conventional tilted rotary kiln 10, a vertical suspension preheater 11, having its lower end 27 communicating with the gas exhausting end of the kiln and an outlet 28, a raw metal bin 12 and feeder 13, an exhaustor 14 and an electrostatic precipitator 15, including the necessary duct 16 connecting the preheater outlet 28 to the exhaustor 14 and electrostatic precipitator.

The novel feature of the invention comprises a wet scrubber 17 which communicates with the lower end 27 of the preheater to the precipitator through duct 18 and the duct 16 leading from the top end of the preheater to the exhaustor. When operating, a portion of the gases exhausted from the kiln pass through the wet scrubber which removes solids and alkali from gases exhausted by the kiln. The resulting slurry which collects in the scrubber may be dumped directly to waste. However it is more economical and practical to pump the slurry to a thickener 20 where the water, which contains a high percentage of alkali, is allowed to overflow to waste leaving a thick slurry which is then pumped to the raw material and grinding mill 21 for grinding and drying raw material used in the clinker manufacturing process. The ground material (meal) is conveyed to the bin 12.

The system may include a further bypass which comprises a duct 22 connected to the duct 16 and the mill 21, the duct 22 being connected to the duct 16 between the preheater outlet 28 and the junction of the duct 18 with the duct 16. The duct 22 includes an auxiliary burner 23. Leading away from the mill 21 is a duct 24 having an exhaustor 25. The exhaustor 25 can discharge directly to the precipitator 15 as shown.

The advantages of the above-described invention are:

(1) Removal from the cement clinker burning system of a substantial portion of the alkali thus permitting production of higher quality cement.

(2) Reduction of dust air pollution by improving the dust-collecting efficiency of the rotary kiln circuit electrostatic precipitator by humidifying the bypass gas.

(3) Reduction of dust air pollution by improving the dust-collecting efficiency of the electrostatic precipitator by humidifying the exhaust gases of the mill by the addition of a thick slury of leached dust to the raw material.

What we claim is:

1. In a cement clinker burning apparatus having a preheater for preheating alkali containing raw meal, a rotary kiln in which the preheated meal is burnt to produce cement clinker, primary duct means connecting the preheater to an electrostatic precipitator, said primary duct means including an exhaustor, means for removing a substantial portion of the alkali released in burning the meal in the rotary kiln, said means comprising bypass duct means leading from the preheater adjacent the meal entrance of the kiln to the primary duct means, a wet scrubber in said bypass duct means whereby a thin slurry containing a high percentage of dissolved alkali is produced and drain means in the scrubber for continuously removing the slurry.

2. A cement clinker burning apparatus according to claim 1 including a slurry pump connected to said scrubber drain means and discharging the thin alkaline slurry into a settling tank permitting settling of undissolved particles to form a thickened slurry in the lower portion of said settling tank, and continuously discharging the thickened slurry through a drain, said settling tank means purposefully permitting overflow to effect decantation of the resulting highly alkaline aqueous solution.

3. A cement clinker burning apparatus according to claim 2 including a slurry pump connected to said tank drain and a thick aqueous slurry discharging into a raw material grinding mill where said slurry is dried with consequent moistening of the exhaust gases produced by said raw material grinding mill.

4. A cement clinker burning apparatus according to claim 3 in which a portion of the exhaust gases in the primary duct means is diverted via a secondary duct means to said raw material grinding mill, the inlet to the secondary duct means being located down stream from the outlet of the bypass duct means.

5. A cement clinker burning apparatus according to claim 4 wherein the secondary duct includes an auxiliary burner to increase the temperature of the exhaust gases flowing therethrough.

6. A cement clinker burning system according to claim 4 in which the humidified exhaust gases from the raw material grinding mill are exhausted via an exhaustor which discharges into the electrostatic precipitator associated with said rotary kiln and preheater.

7. A method of reducing the alkali content of cement clinker produced in a cement clinker producing apparatus having a suspension preheater which delivers preheated raw meal to a rotary kiln wherein is produced cement clinker and hot gases containing alkali and solid material, an electrostatic precipitator being provided through which said gases are discharged to atmosphere, comprising the steps of:

(a) withdrawing a portion of the hot exhaust kiln gases from a point adjacent the gas exhaust of the rotary kiln;

(b) passing said portion through a wet scrubber to remove alkali and solid material therefrom and produce a thin slurry;

(c) delivering the gaseous portion obtained from step (b) to the electrostatic precipitator; and (d) removing the slurry from the scrubber.

8. The method according to claim 7, the additional steps of passing the said slurry through a thickener and purposefully overflowing said thickener to remove dissolved alkali and the thickened slurry is delivered to a raw material grinding and drying device.

9. The method according to claim 8, the additional step of passing a portion of the hot kiln exhaust gases through said grinding mill and then to said precipitator whereby said gases dry the raw material, the gases being moistened thereby before entering the precipitator.

References Cited

UNITED STATES PATENTS

| | | | |
|---|---|---|---|
| 2,883,173 | 4/1959 | Laboulais | 263—32 |
| 3,288,450 | 11/1966 | Bade | 263—32 |
| 3,365,521 | 1/1968 | Brachthauser | 263—53 |

FOREIGN PATENTS 626,639 8/1961 Canada.

CHARLES J. MYHRE, Primary Examiner

U.S. Cl. X.R.

263—53